United States Patent

[11] 3,612,854

| [72] | Inventors | Harold E. Todd; |
| | | George W. Onksen, both of Anderson, Ind. |
| [21] | Appl. No. | 779,880 |
| [22] | Filed | Nov. 29, 1968 |
| [45] | Patented | Oct. 12, 1971 |
| [73] | Assignee | General Motors Corporation |
| | | Detroit, Mich. |

[54] HEADLAMP WITH INTEGRAL AIMING AND INSPECTION GAGES
5 Claims, 12 Drawing Figs.

| [52] | U.S. Cl. | 240/41.6, |
| | | 33/46 H, 33/180 L, 240/44 R |
| [51] | Int. Cl. | F21v 7/00, |
| | | F21v 19/02, F21v 21/16 |
| [50] | Field of Search | 240/41.6, |
| | | 44, 44.1, 41.62; 33/46.2 H, 180 L |

[56] References Cited
UNITED STATES PATENTS

| 1,609,634 | 12/1926 | Ryan | 240/41.6 |
| 2,058,743 | 10/1936 | Trippe | 240/41.6 X |
| 2,557,893 | 6/1951 | Russell et al. | 33/180 L |
| 2,609,611 | 9/1952 | Dickson | 33/180 L |
| 2,797,494 | 7/1957 | Irwin | 33/180 L |
| 2,887,779 | 5/1959 | Hearn | 33/180 L |
| 3,047,958 | 8/1962 | Durbin | 33/180 L |

FOREIGN PATENTS

| 526,329 | 2/1954 | Belgium | 33/180 L |

Primary Examiner—Samuel S. Matthews
Assistant Examiner—Robert P. Greiner
Attorneys—J. L. Carpenter and E. J. Biskup ABSTRACT: A motor vehicle headlamp wherein a projection lamp, universally adjustably connected to a motor vehicle by a unitary hinge, has a rearward aiming and seating plane which, when positioned in a known plane relative to the vehicle, will project a light beam in a desired horizontal and vertical illumination pattern. An aiming block formed on the hinge and referenced to the aiming plane cooperates with an aiming string connected between headlamps on opposite sides of the vehicle to visually indicate when the lamp is properly horizontally oriented. A liquid level referenced to the aiming plane visually indicates when the lamp is properly vertically oriented.

PATENTED OCT 12 1971 3,612,854

INVENTORS
Harold E. Todd, &
BY George W. Onksen

E. J. Biskup
ATTORNEY

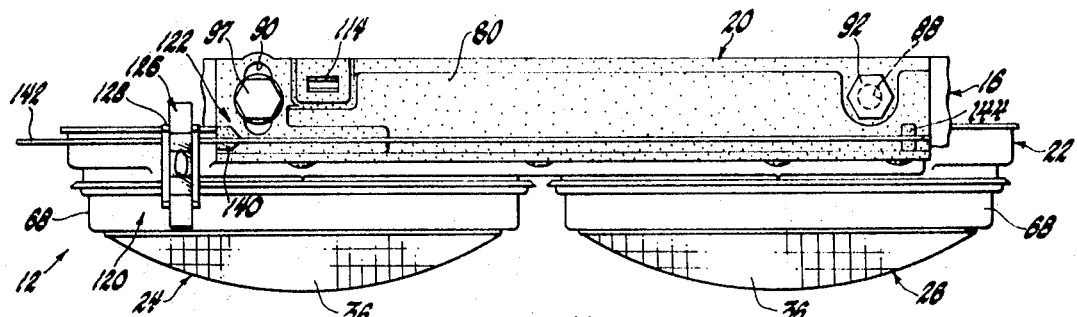
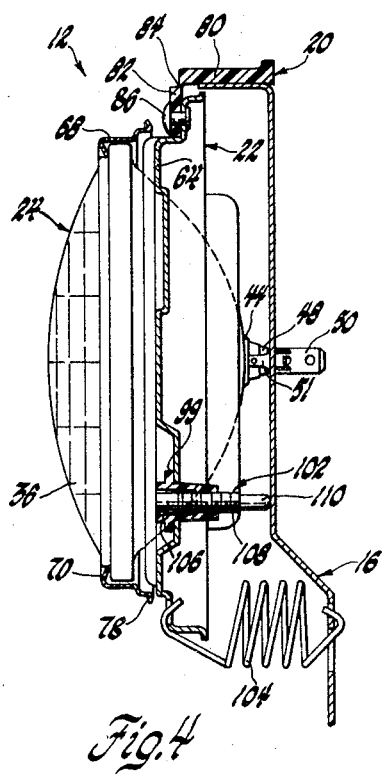
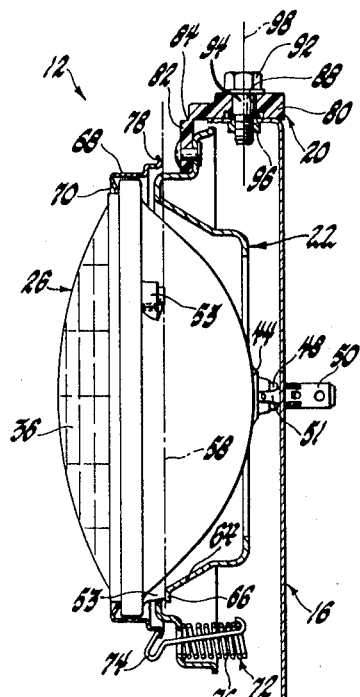

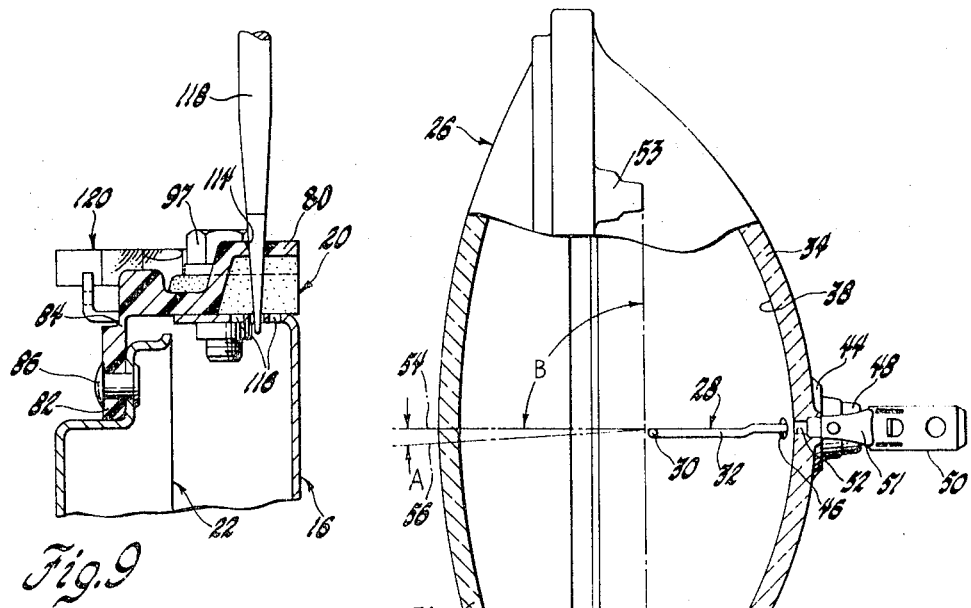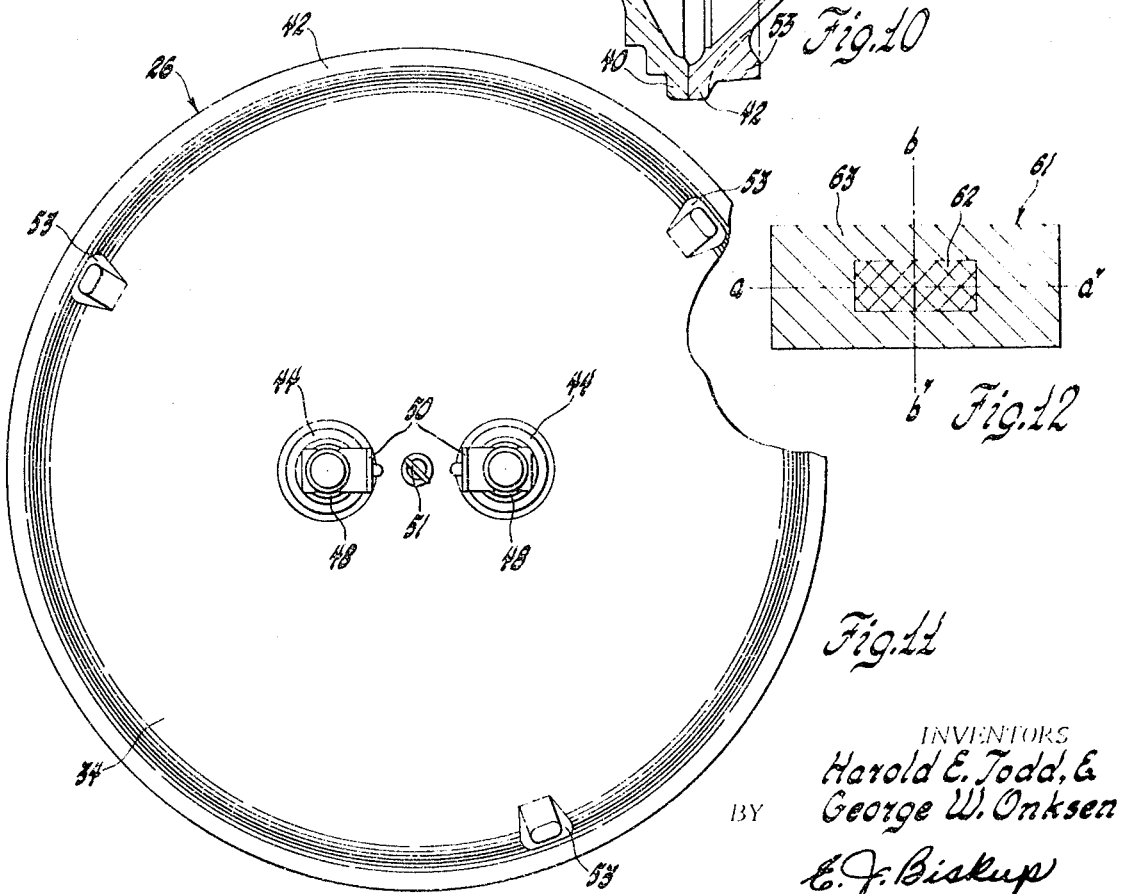

HEADLAMP WITH INTEGRAL AIMING AND INSPECTION GAGES

With the adoption of preaimed sealed beam projection lamps of the type disclosed in Arnold et al. U.S. Pat. No. 2,870,363 and assigned to the assignee of the present invention, proper optical aiming of motor vehicle headlamps could be precisely obtained with simple geometrical instruments thereby replacing less accurate optical aiming equipment and subjective visual aiming techniques. Lamps of this type incorporate a plurality of reference points on the lens that lie in a plane having predetermined angular relationship with the actual optical axis of the unit. In this manner, the lamp can be manufactured to distribute a selected portion of the light beam in a desired illumination pattern when oriented in a known plane and thereby correct for optical imperfections arising from the manufacturing operations.

These lamps are conventionally mounted on the vehicle at a ball-and-socket connection and are universally adjustably positioned thereabout by a pair of aiming screws. To optically aim the lamps in assembly, a mechanical or primary aimer having horizontal and vertical indicating devices is clamped to the lamp lens with a planar surface engaging the reference points. The devices serve to indicate the vertical and horizontal inclination of the planar surface and, in turn, the position of the reference points and the actual optical axis of the lamp. Thus, by selectively rotating one of the aiming screws until the vertical-indicating device is centered, the lamp will be correctly positioned in a vertical-aiming plane. Similarly, by selectively rotating the other aiming screw until the horizontal-indicating device is centered, the lamp will be correctly positioned in a horizontal-aiming plane.

However, all aiming equipment including the above-noted mechanical aimer have inherent tolerances or inaccuracies. In other words, although the devices indicate that the lamp is accurately horizontally and vertically positioned, the "actual aim" may be above or below, or, right or left of the "indicated aim." The problem of ascertaining "actual aim" is further magnified when the lamp position is checked by an audit or inspection aimer. Like the mechanical aimer, the inspection aimer includes inherent tolerances or inaccuracies. In some instances, the tolerance will be cumulative to that of the primary aimer such that a properly aimed lamp will be indicated as "out of aim." On the other hand, the tolerances may be subtractive and the inspection aimer will fail to indicate that the lamp is "out of aim."

For example, a typical standard for vertical aim is plus or minus 2 inches at 25 feet. Therefore, if the primary and inspection aimers each have a plus or minus 1 inch tolerance on vertical aim, a permissive misalignment of plus 2 inches or minus 2 inches is possible if the tolerances are cumulative. Thus, a lamp having perfect optical aim will be indicated as being on the borderline of tolerable vertical aim. Conversely, the lamp may be on the borderline of tolerable vertical aim but, due to subtractive tolerances, will be indicated as having perfect optical aim. On the assembly line, more elaborate and accurate-aiming equipment can be utilized which, to some extent, minimizes the discrepancies between "actual aim" and "indicated aim." However, in the field, the lack of standardized and accurately calibrated aimers accounts for a large percentage of headlamp alignment problems.

The present invention contemplates overcoming the above-noted problems by providing a headlamp having integral horizontal and vertical aiming and inspection gages. With this feature, the same gages are used for aiming and inspection operations thereby eliminating one set of gage inaccuracies. Therefore, the errors in the inspection devices are eliminated from the determination of proper headlamp aim. Moreover, the built-in features of this gage make it possible to obtain proper headlamp aim without using any supplemental aiming equipment and, at any time thereafter, visually inspect this system to determine whether the lamps are properly aligned.

In the accomplishment of these features, a sealed beam lamp is secured to a mounting plate that is attached to a one-piece plastic hinge member. The hinge member has an upper arm pivotally connected to the vehicle frame for accommodating movement of the lamp in a horizontal aiming plane and a lower arm, joined to the upper arm by a transverse flexible web, for accommodating pivotal movement of the lamp in a vertical-aiming plane. A single-aiming screw, adjustably connected between the mounting plate and the vehicle frame, serves to selectively position the lamp about the web in a vertical-aiming plane. Pivotal movement of the hinge member and the mounting plate relative to the frame serves to selectively position the headlamp in a horizontal-aiming plane.

The present headlamp also incorporates a sealed beam projection lamp having a common aiming and seating plane formed on the rear surface of the reflector. The aiming plane has a known position relative to the actual optical axis of the lamp such that, when positioned in a known plane, a selected portion of the light beam will be projected in a desired horizontal and vertical illumination pattern. The aiming plane seats against a complementary planar surface formed on the mounting plate and, in this manner, correct positioning of the latter will accurately align the light beam with respect to the motor vehicle. Therefore, a damaged lamp can be replaced without reaiming of the headlamp system. Moreover, this provision permits complementary pairs of lamps to be simultaneously aimed in one operation rather than requiring individual aiming of the lamps. The simultaneous aiming of the lamps also eliminates two inspection operations thereby reducing possible discrepancies between "actual aim" and "indicated aim" for the headlamp system.

The vertical aiming and inspection gage of the present invention comprises a liquid level which is connected to the mounting plate and preset such that when the bubble is centered, the aiming plane is correctly vertically oriented. Accordingly, by selectively rotating the aiming screw, the operator can conveniently position the lamp and mounting plate about the hinge axis until the correct vertical position is established. Thereafter, by visually inspecting the level, the operator can determine whether the lamp is within the limits of tolerable vertical aim. The horizontal aiming and inspection gage comprises a flexible aiming string which extends between the left-hand and right-hand headlamps and an aiming block which is formed on the hinge member and has inspection surfaces corresponding to the limits of tolerable horizontal aim. Accordingly, by selectively pivoting the hinge member until the string is centered between the inspection surfaces, the operator can conveniently establish the correct horizontal position of the lamp. Thereafter, by visually inspecting the aiming string and block, the operator can determine whether the lamp is within the limits of tolerable horizontal aim.

Therefore, it is an object of the present invention to provide a headlamp for use on motor vehicles that includes integral aiming and inspection means for obtaining and maintaining proper optical aim.

It is another object of the present invention to provide a motor vehicle headlamp mounting wherein a pair of lamps can be simultaneously universally positioned relative to the vehicle to establish optimum horizontal and vertical headlamp aim.

An additional object of the present invention is to provide a headlamp for a motor vehicle wherein a projection lamp having a rearward-aiming plane formed thereon that will project the light beam in a desired horizontal and vertical illumination pattern when positioned in a known plane relative to the vehicle in universally adjustably connected to the vehicle, the headlamp further including integral aiming and inspection devices referenced to the aiming plane for establishing the desired horizontal and vertical illumination pattern.

Another object of the present invention is to provide a motor vehicle headlamp wherein a lamp is secured against a mounting plate which is connected to a hinge member, the hinge member having a transverse hinge connection for accommodating vertical positioning of the lamps and being pivotally connected to the vehicle frame for accommodating horizontal positioning of the lamp.

A further object of the present invention is to provide a vehicle headlamp system wherein the left-hand and right-hand headlamps are respectively connected to a hinge member that accommodates universal vertical and horizontal positioning of an associated lamp, the individual headlamps including built-in horizontal and vertical aiming and inspection gages for obtaining and maintaining correct vertical and horizontal aim in the system.

A still further object of the present invention is to provide a motor vehicle headlamp that is universally connected to the vehicle by a one-piece plastic hinge and includes built-in aiming and inspection gages for obtaining and maintaining proper horizontal and vertical aim of a preaimed projection lamp, vertical aim being indicated by a liquid level and horizontal aim being indicated by an aiming string and aiming block wherein the level, the aiming string, and the aiming block are referenced to the actual optical axis of the lamp.

These and other objects will be apparent to one skilled in the art upon reading the following detailed description, reference being made to the accompanying drawings in which:

FIG. 3 is a view taken along line 3—3 of FIG. 2;

FIG. 4 is a view taken along line 4—4 of FIG. 2;

FIG. 5 is a view taken along line 5—5 of FIG. 2;

FIG. 6 is an enlarged view taken along line 6—6 of FIG. 2;

FIG. 7 is an enlarged perspective view of the support bracket for the horizontal aiming string;

FIG. 8 is an enlarged perspective view of the integral horizontal and vertical aiming and inspection gages of the present invention;

FIG. 9 is an enlarged view taken along line 9—9 of FIG. 2;

FIG. 10 is an enlarged partially sectioned view of a sealed beam lamp used in the present invention;

FIG. 11 is a rear view of the lamp shown in FIG. 10; and

FIG. 12 is a diagrammatic illustration of a light beam projected from the lamp positioned with respect to the horizontal- and vertical-aiming planes.

Figure 1:
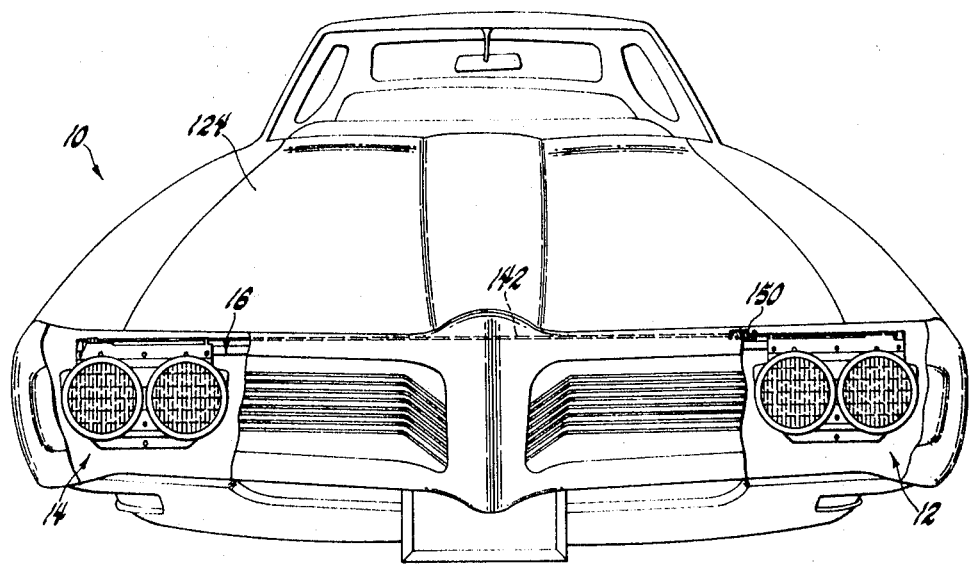
FIG. 1 is a perspective view of a motor vehicle having a headlamp system incorporating headlamps made in accordance with the present invention.

Referring now to FIG. 1, there is shown a headlamp system for a motor vehicle 10 having a left-hand headlamp 12 and a right-hand headlamp 14 installed in a symmetrical oppositely disposed arrangement with respect to a longitudinal axis of the vehicle. Each headlamp is mounted on a transverse frame member 16 and includes a complementary pair of projection lamps or lighting units which operate to form a four-lamp vehicle headlamp system of the type disclosed in Falge U.S. Pat. No. 3,062,951 and assigned to the assignee of the present invention wherein four lamps are illuminated for "high-beam" operation and the outboard lamps are illuminated for "low-beam" operation. Upon vehicle installation, each headlamp 12 and 14 is partially concealed by decorative bezels leaving only the lenses of the lamps frontally exposed.

Figure 2:
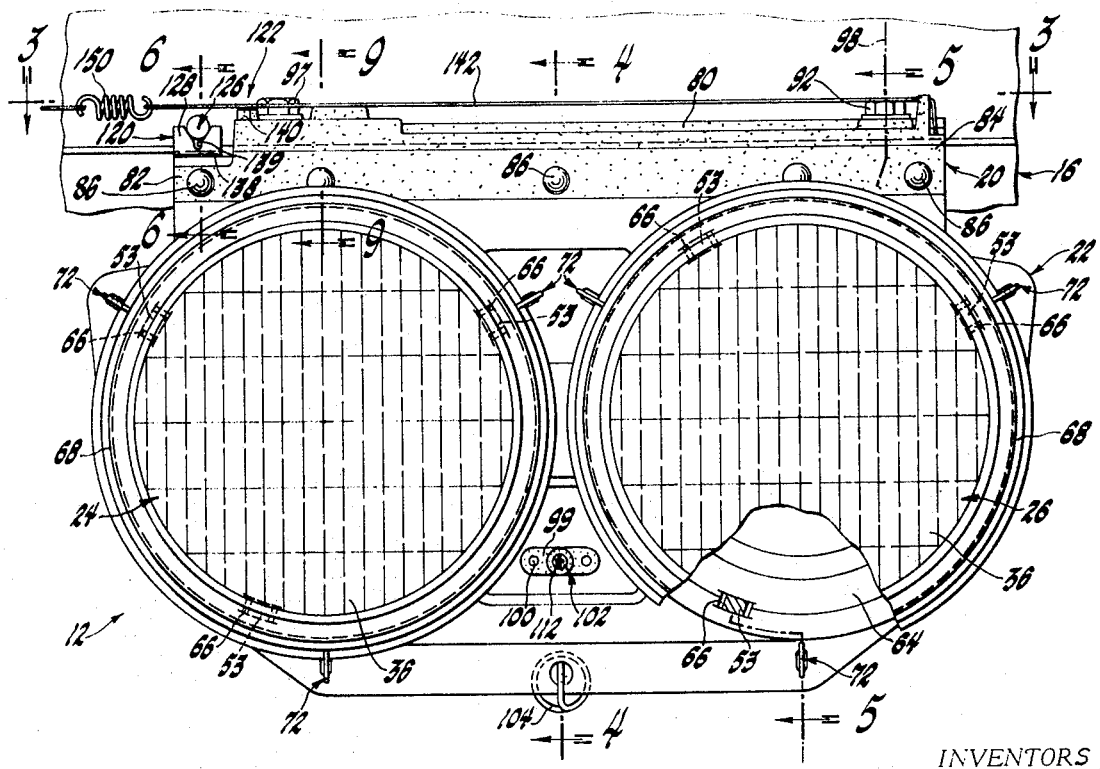
FIG. 2 is an enlarged partially sectioned front view of the left-hand headlamp shown in FIG. 1.

Inasmuch as the headlamps are mirror images in that the inboard and outboard arrangements are identical, a description of the structural details will be given with reference to the left-hand headlamp 12 which is shown in FIGS. 2 through 9. Referring to FIG. 2, the headlamp 12 generally comprises a hinge 20, a mounting plate 22, and a pair of projection lamps 24 and 26. While the lamps 24 and 26 are illustrated as being horizontally aligned in a four-lamp system, it will be hereafter appreciated that the present invention can also be used in headlamp systems having vertically aligned or inclined lamps. Moreover, the invention can be used in conjunction with a two-lamp system.

Referring to FIGS. 10 and 11, the inboard or "high-beam" lamp 26 is preferably an all-glass construction and comprises, in general, a light source 28 including a filament 30 and lead wires 32 enclosed by a reflector 34 and a lens 36. As is conventional, the reflector 34 has a reflective inner surface 38, in the form of a paraboloid formed by a bright metallic deposit, for imparting directional control to the light rays emanating from the filament 30. The lens 36 includes a suitable optical faceting for imparting directional control to the light rays controlled by the reflector 34.

The lens 36 is integrally joined by fusion sealing to the reflector 34 at mating annular flanges 40 and 42. The rear surface of the reflector 34 is provided with spaced bosses 44 which define passageways 46 extending through the reflector 34. The light source 28 is supported on the reflector 34 by means of metallic ferrules 48 which are disposed over the passageways 46 and have their open ends embedded in the bosses 44. The filament 30 is connected between the lead wires 32 which extend through the passageways 46 and are electrically and structurally attached to the interior surface of the ferrules 48. An electrical terminal 50 is soldered to each of the ferrules 48 and serves to connect the filament 30 to a source of electrical power. The lamp 26 is preferably filled with an inert gas to a pressure-exceeding atmospheric pressure and hermetically sealed by a closure, as at 51, of an evacuating passage 52. Additionally, as shown in FIG. 11, three rearwardly extending reference elements 53 are formed on the rear surface of the reflector 34 adjacent the peripheral flange 42.

During the manufacture of the projection lamp thus far described, a lighting unit or lamp, which for descriptive purposes may be called an "imperfect" lamp, is formed due to tolerances incident to the manufacturing techniques. An optically "perfect" lamp, insofar as aiming is concerned, would be one which directs selected portions of the light beam in a known direction relative to a selected geometrical axis of the lamp. However, this "perfect" lamp cannot be achieved in high volume commercial production because of the lack of precise positioning of the parts of the optical system and as well as the inaccuracies in individual components of the lamp.

Thus, as shown in FIG. 10, an "imperfect" lamp may project a light beam having a direction indicated by the line or actual optical axis 54 which is coincident with the intended beam direction and angularly displaced from the geometrical or desired axis 56 by an angle A. The intended beam direction has a known angular displacement relative to the longitudinal axis of the vehicle to project the light beam in the desired horizontal and vertical illumination pattern.

Accordingly, a planar surface is necessary on the lamp which can be geometrically referred to the longitudinal axis. To accomplish this result, the reference elements 53 are ground to define an aiming and seating plane 58 having a known angular displacement B from the actual optical axis 54 and the longitudinal axis of the vehicle. Therefore, when the aiming plane 58 is correctly positioned with respect to the vehicle, the lamp 26 will forwardly project the light beam in the desired horizontal and vertical illumination pattern. While the aiming plane 58 may be referenced to any selected portion of the light beam, motor vehicle lamps are aimed to establish directional control of the most intense portion of the light beam. This intense portion is commonly referred to as the "hot spot" whereas the surrounding portion is known as the "body light." For the diagrammatic illumination pattern 61 shown in FIG. 12, the actual shape and intensity of the "hot spot" 62 and the "body light" 63 are controlled by appropriate optical design of the lens 36.

In the practice of this invention as applied to the motor vehicle projection lamps, it is preferred to determine the aiming plane position with respect to the direction of the "hot spot" light portion of the projected light beam. Furthermore, it is desirable to aim the "hot spot" at a specified deflection angle with respect to the straight-ahead direction or longitudinal axis of the vehicle. The aiming specification may be for either upper or lower beam aim. The actual aim, for example, may be specified with respect to the longitudinal axis as 0.4 degree down in the vertical-aiming plane and 2.0 degrees right in the horizontal aiming plane or any other suitable values depending upon the particular projection lamp and installation. This aiming specification, of course, has reference to the light beam direction. Therefore, the lamp will be correctly vertically oriented when the "hot spot" 62 is accurately referenced with respect to a transverse horizontal axis $a—a'$ as moved in a vertical-aiming plane. Similarly, the lamp will be correctly horizontally oriented when the "hot spot" 62 is accurately referenced with respect to a vertical axis $b—b'$ as moved in a horizontal-aiming plane.

With the above-described construction wherein the aiming plane 58 is formed on the rear surface of the reflector 34, damaged lamps may be replaced on the vehicle without requiring headlamp reaiming. In other words, because the aiming plane 58 is also the seating plane, individual preaimed projection lamps can be interchanged on a properly aligned headlamp mounting without affecting the optical aim of the headlamp system.

Referring to FIG. 2, the mounting plate 22 includes a pair of laterally spaced open ended dish-shaped sections 64 for receiving and rearwardly protecting the reflectors 34 of the lamps 24, 26. Each section 64 has three circumferentially spaced seating surfaces 66 which, as shown in FIG. 5, are adapted to register with an engage the reference elements 53. The seating surfaces 66 define a mounting plane which, in assembly, is coextensive with the aiming plane 58. Therefore and as will be described below, proper orientation of the mounting planes and the mounting plate 22 will simultaneously correctly position the individual lamps 24, 26.

As shown in FIGS. 2 and 5, the reference elements 53 seat against the seating surfaces 66 to position the lamps 24 and 26 on the mounting plate 22. An annular retaining ring 68 encircles each of the lamps 24, 26 and has a radially inwardly turned front rim 70 that engages the outer periphery of the lens 36. A plurality of circumferential fastener assemblies 72, each of which comprises a hook 74 and a compression spring 76, engage a radially outwardly turned rear flange 78 of the retaining ring 68 to resiliently clamp the lamp 26 against the mounting plate 22. By using the resilient fastener assemblies 72, a substantially constant pressure will be applied against each lamp 24 and 26 despite any angularity that might exist between the lens 36 and the seating plane 58.

Referring to FIG. 4, the hinge 20 is formed in one piece from a plastic material such as polypropylene and generally comprises a rearwardly extending horizontal arm 80 and a downwardly depending lower arm 82 which are mutually joined by a transversely extending flexible web 84. The web 84 has a distinctly reduced cross section and defines a hinge axis about which the arms 80 and 82 are relatively pivotable. As shown in FIGS. 2 and 5, the arm 82 is fixedly attached to the mounting plate 22 by a plurality of laterally spaced rivets 86.

Referring to FIG. 3, a hole 88 is formed at the outboard end of the arm 80 and an elongated longitudinal slot 90 is formed at the inboard end. As shown in FIG. 5, a fastener assembly including a bolt 92 and a bushing 94 extends through the hole 88. The bolt 92 is threaded through a nut 96 attached to the frame member 16 and serves as a pivotal connection about which the headlamp 12 can be adjusted as will be explained below. As illustrated in FIG. 9, a similar fastener assembly including a bolt 97 is used to secure the inboard end of the hinge 20 to the frame member 16 at the slot 90. The axes defined by the bolts 92 and 97 are laterally aligned in a plane perpendicular to the longitudinal axis of the vehicle. Thus, it will be appreciated that the hinge 20, the mounting plate 22, and the lamps 24 and 26 are pivotable about a vertical axis 98 passing through the bolt 92 within the limits defined by the slot 90.

As illustrated in FIGS. 2 and 4, the mounting plate 22 and the lamps 24 and 26 are movable as a single unit about the horizontal hinge axis provided by the web 84 by means of a vertical-aiming mechanism including a plastic aiming nut 99 attached to the mounting plate 22 by means of fasteners 100, an aiming screw 102, and a tensioned spring 104. The aiming screw 102 is threaded through the aiming nut 99 and includes a head 106, a threaded shank 108, and a rounded tip 110. As seen in FIG. 2, the head 106 includes crossed slots 112 for accommodating a suitably shaped adjusting tool and, preferably, an opening is provided in the headlamp bezel to receive the adjusting tool and facilitate alignment of the lamps. The spring 104 has one end connected to the frame member 16 and the other end connected to the mounting plate 22. The spring 104 is sufficiently extended to continuously urge the tip 110 into engagement with the frame member 16.

As shown in FIG. 9, a slot 114 is formed in the upper arm 80 of the hinge 20. The slot 114 registers with a plurality of slots 116 formed in the frame member 16. The slots 114 and 116 accommodate a conventional handtool, such as a screwdriver 118. Therefore, pivoting the screwdriver 118 will shift the hinge 20, the mounting plate 22, and the lamps 24 and 26 in a horizontal-aiming plane about the vertical axis 98 passing through the center of bolt 92.

The headlamp 12, as shown in FIG. 3, additionally includes an integral or built-in vertical aiming and inspection gage 120 and a horizontal aiming and inspection gage 122, both of which are visible and accessible when the hood 124 of the motor vehicle 10 is in a raised position.

More specifically, the vertical aiming and inspection gage 120 comprises a liquid level 126 mounted on a support bracket 128 that is fixedly attached at the upper inboard end of the mounting plate 22. As shown in FIG. 6, the level 126 comprises a concentric cylindrical casing 130 which is filled with a metered amount of fluid and capped to form an air bubble 132. Spaced pairs of rings 134 and 136 are scribed on the casing 130 and define, in assembly, aiming and inspection limits for vertical headlamp aim. Thus, when the bubble 132 is centered between the rings 134, the lamps 24 and 26 are correctly positioned in the vertical-aiming plane and, when the bubble 132 is between the rings 136, the lamps 24 and 26 are within the limits of tolerable vertical headlamp aim.

Referring to FIGS. 2 and 6, the bracket 128 includes upwardly extending legs 138, each of which has a V-shaped notch 139 formed therein. By use of an appropriate fixture, the seating surfaces 66 formed in the mounting plate 22 are positioned in a plane which will place the light beams of the lamps 24 and 26 in the desired horizontal and vertical illumination pattern relative to the longitudinal axis of the vehicle. Then, an appropriate forming tool such as a grinding wheel is passed over the notches 139 to accurately form seating surfaces which are parallel to the longitudinal axis of the vehicle. Thereafter, the level 126 is cemented to the bracket 128 with the outer surface of the casing 130 engaging the seating surfaces and, inasmuch as the casing 130 is concentric, the level 126 may be randomly located on the bracket 128 and still serve to accurately indicate correct vertical aim. Therefore, when the headlamps 12 and 14 are mounted on the vehicle, proper vertical positioning of the lamps 24 and 26 will be visually indicated when the bubble 132 is centered between rings 134. The permissive or tolerable vertical misalignment will be indicated when the bubble 132 is between the other pair of rings 136.

Referring to FIG. 3, the horizontal aiming and inspection gage 122 comprises a generally trapezoidal aiming block 140 formed on the upper surface of the arm 80 and an aiming string or wire 142 which, as shown in FIG. 1, extends transversely between the headlamps 12 and 14 perpendicular to the longitudinal axis of the vehicle. As shown in FIG. 7, the aiming string 142 is supported at the outboard end of the arm 80 by an upwardly extending bracket 144. One end of the string 142 is knotted and retained within a slot 146 formed adjacent the bracket 144. The aiming string 142 is longitudinally positioned at a V-shaped notch 148 formed at the top of the bracket 144. The other end of the string 142 is similarly retained in a slot formed in the upper arm of the right-hand headlamp 14. Referring to FIG. 2, a coiled spring 150 is located at an intermediate portion of the aiming string 142 and serves to keep the latter in tension at all times.

As shown in FIGS. 3 and 8, the aiming block 140 has spaced parallel inspection surfaces 152 and 154 and a triangular aiming tip terminating at an apex 156, all of which are referenced to the aiming planes 58 and seating surfaces 66 and, in assembly, to the longitudinal axis of the vehicle. Therefore, when the aiming string 142 is positioned above the apex 156, the lamps 24 and 26 will be correctly positioned in the horizontal-aiming plane. When the aiming string 142 is located between the inspection surfaces 152 and 154, the lamps 24 and 26 will be within tolerable limits for horizontal headlamp aim.

To most conveniently establish proper optical aim for the headlamp system, it is desirable to initially perform the horizontal-aiming operation inasmuch as there is a slight deviation from true horizontal movement of the lamps 24 and 26 due to the fact that the assembly has an offset pivot point at the tip 110 of the aiming screw 102. In other words, the mounting plate will pivot slightly about the web 84 as the hinge is pivoted about the vertical axis 98.

Thus, with the vehicle positioned on a level surface and the hood 124 raised, the bolt 97 is slightly loosened and the hinge 20 is shifted horizontally by means of the screwdriver 118 until the aiming string 142 is centered at the apex 156 of the aiming block 140. Thereafter, by visual inspection, the operator can conveniently determine whether horizontal realignment is required. After the bolt 97 has been tightened to securely lock the hinge 20 against the frame member 16, the aiming screw 102 is selectively rotated until the bubble 132 is centered between the inspection rings 134. Thereafter, the operator can conveniently visually inspect the vertical-aiming gage 120 to determine if any vertical reaiming is required. Thus, it will be appreciated that the operator with ordinary tools can inspect and maintain the vehicle lamps in proper optical alignment and, even in the event that replacement of a damaged lamp is necessary, do so without the aid of any supplemental aiming equipment.

Those skilled in the art will appreciate that the above-noted features can be variously combined to give an improved and simplified headlamp system. For instance, the hinge may take a more conventional form and still permit universal movement of the lamp for proper optical positioning. Moreover, a hinge and mounting plate construction offers numerous advantages independent of the built-in horizontal- and vertical-aiming gages and is adaptable for use with conventional preaimed lighting units. Also, the horizontal and vertical aiming and inspection gages can be beneficially incorporated on existing headlamp constructions to provide the maintenance and inspection advantages described above. Furthermore, the horizontal adjustment and the horizontal aiming and inspection gage may be eliminated if the location of the transverse frame member 16 can be maintained within the tolerable limits for horizontal headlamp aim. However, it should be remembered that the aiming gages should be accurately referenced to the actual optical axis of the lamps to provide a dependable indication of the aiming in the headlamp system and thereby insure optimum forward visibility for night time driving.

Although only one form of this invention has been shown and described, other forms will be readily apparent to those skilled in the art. Therefore, it is not intended to limit the scope of this invention by the embodiment selected for the purpose of this disclosure but only by the claims which follow.

What is claimed is:

1. An adjustable motor vehicle headlamp mounting for simultaneously aiming a pair of preaimed lighting units having a plurality of reference elements formed on a rear surface thereof defining a common aiming and seating plane which, when positioned relative to a known plane, will project light rays in desired horizontal and vertical aiming planes, said headlamp mounting comprising: a hinge having a pair of arms relatively pivotable about a horizontal hinge axis, one of said arms adapted to be pivotally connected to said motor vehicle for movement of said hinge as a unit about a vertical axis; a mounting plate fixedly connected to the other of said arms, said mounting plate adapted to support said lighting units and having seating surfaces formed thereon engaging said reference elements for inherently aligning and seating said lighting units relative to said seating surfaces thereby permitting direct replacement of damaged lighting units without reaiming a single aiming screw adapted to be operatively connected between the mounting plate and said motor vehicle for simultaneously pivoting both of said lighting units and said mounting plate about said hinge axis; a vertical aiming and inspection device permanently carried by said headlamp mounting and referenced to said seating surfaces for indicating when the latter is positioned in said known plane; and a horizontal aiming and inspection device operatively carried on said headlamp mounting and referenced to the seating surfaces for indicating when the latter is in said known plane whereby the common referencing of the aiming and inspection devices and said reference elements eliminates discrepancies between separate aiming and inspection devices and permits said lighting units to be simultaneously located in said aiming planes by selective positioning of said mounting plate seating surfaces.

2. A motor vehicle headlamp having an integral aiming and inspection gage which is visible and accessible when the hood of the vehicle is in a raised position for indicating vertical headlamp aim, said headlamp comprising: an elongated one-piece hinge formed of a plastic material having a first arm adapted to be connected to the vehicle and a second arm hingedly connected to the first arm at a flexible web defining a transverse horizontal hinge axis; a preaimed projection lamp having an actual optical axis and projecting light rays therefrom in an illumination pattern for correct vertical headlamp aim when said actual optical axis bears a known angular relationship to said longitudinal axis of the vehicle, said lamp being preaimed by having a plurality of reference elements formed on said lamp defining a common aiming and seating plane having a known angular relationship to said actual optical axis; a mounting plate fixedly connected to said second arm of said hinge; a plurality of seating surfaces formed on said mounting plate and defining a lamp mounting plane which permits direct replacement of lamps without reaiming; means clamping said projection lamp on said mounting plate and said reference elements against said seating surfaces; an aiming screw operatively connected to said mounting plate for pivoting the latter and said lamp about said web to establish vertical headlamp aim; a vertical aiming and inspection gage operatively carried by said headlamp and referenced to said mounting plane for indicating when the latter is aligned for correct headlamp aim whereby said illumination pattern will be aligned for correct vertical headlamp aim when said mounting plane and said aiming plane are positioned in said known plane relative to said vehicle as indicated by said vertical aiming and inspection gage thereby eliminating discrepancies caused by compounding gage inaccuracies from separate aiming and inspection devices.

3. A headlamp for use in a motor vehicle headlamp system having headlamps installed in symmetrically disposed relationship with respect to the longitudinal axis of the vehicle, each headlamp comprising: an elongated plastic hinge having first and second arms hingedly interconnected at a flexible web, said first arm adapted to be pivotally connected to the vehicle for movement about a vertical axis when said web is in a horizontal plane; a mounting plate fixedly connected to said second arm for pivotal movement therewith about said web, said mounting plate including a plurality of seating surfaces aligned with a common plane; a sealed beam projection lamp including a light source, a reflector for imparting directional control to light rays emanating from the light source, and a lens sealed to the reflector for imparting directional control to the light rays controlled by the reflector and distributing the light rays in a desired horizontal and vertical illumination pattern; a plurality of reference elements formed on the rear surface of said reflector and adapted to register with said seating surfaces, said reference elements defining an aiming plane which, when located in a known plane relative to said longitudinal axis, will project said light rays in said desired horizontal and vertical illumination pattern; fastener means including a retaining ring engaging said lens for resiliently clamping said reference elements against said seating surfaces to inherently align and seat said lamp; an aiming screw operatively connected to the mounting plate for pivoting said lamp and said mounting plate about said web; vertical and horizontal aiming and inspection gages nondetachably connected to said headlamp and visible when the hood of said vehicle is in a raised position, said vertical aiming and inspection gage comprising a liquid level having an entrapped air bubble, said level being positioned at a predetermined angular relationship with respect to said seating surfaces of said mounting plate; spaced pairs of inspection lines on said liquid level, one pair of said inspection lines indicating correct vertical headlamp aim when said bubble is located therebetween, the other pair of said inspection lines indicating tolerable vertical headlamp aim when said bubble is located therebetween, said horizontal aiming and inspection gage comprising an aiming block at the inboard end of said headlamp and an aiming string adapted to extend transversely between said headlamps and be supported at the outboard ends thereof, said aiming block having a point for indicating correct horizontal headlamp aim when said string is located at said point and spaced inspection surfaces formed on opposite sides of said point for indicating tolerable horizontal headlamp aim when said aiming string is located therebetween whereby the common referencing of the gages and the lamps to said seating surfaces permits direct replacement of lamps without reaiming and eliminates discrepancies between "actual aim" and "indicated aim" caused by separate aiming and inspection devices.

4. In a motor vehicle headlamp system having preaimed projection lamps universally adjustably connected to the vehicle that provide a desired illumination pattern relative to the vehicle when a selected portion of a light beam projected therefrom is positioned in a predetermined aiming plane, the improvement comprising: a plurality of reference elements formed on said lamp defining a common aiming and seating plane which, when positioned in a known plane relative to said longitudinal axis, will project said selected portion of said light beam in said desired illumination pattern; and aiming and inspection means permanently carried by said headlamp for indicating when said lamps are in said known plane and said selected portion of said light beam is positioned in said predetermined aiming plane, said aiming and inspection means being jointly with said reference elements referenced to said common aiming and seating plane whereby said common referencing permits direct replacement of said lamps without reaiming and eliminates discrepancies occasioned by compounding gage inaccuracies from separate aiming and inspection devices.

5. In a motor vehicle headlamp system having headlamps installed in symmetrically opposed relationship with respect to a longitudinal axis of the vehicle, each headlamp comprising: a preaimed sealed beam lighting unit including a light source, a reflector for imparting directional control to light rays emanating from the light source, and a lens sealed to the reflector for imparting directional control to the light rays controlled by the reflector and distributing the light rays in a desired vertical illumination pattern, said lighting unit being preaimed by having a plurality of reference elements formed on the rear surface of the reflector defining a common aiming and seating plane which when located in a known vertical plane relative to said longitudinal axis, will project said light rays in said desired vertical illumination pattern; an mounting plate adapted to support said lighting unit and including a plurality of seating surfaces defining a mounting plane and adapted to register with and engage said reference elements; fastener means including a retaining ring engaging said lens and clamping said reference elements against said seating surfaces to inherently align and seat said lighting unit thereagainst and permit direct replacement of lighting units without reaiming; hinge means connecting said mounting plate to the vehicle for pivotal movement about a substantially horizontal hinge axis; adjusting means operatively connected between said vehicle and said mounting plate for selectively positioning said lighting unit about said hinge axis to establish said desired vertical illumination pattern; and integral aiming means permanently carried on said headlamp and jointly referenced to said seating surfaces, said reference elements, and said longitudinal axis for indicating when said mounting plate and thereby said lighting unit is located in said known plane for distributing said light beam in said desired vertical illumination pattern.